Figure 5:
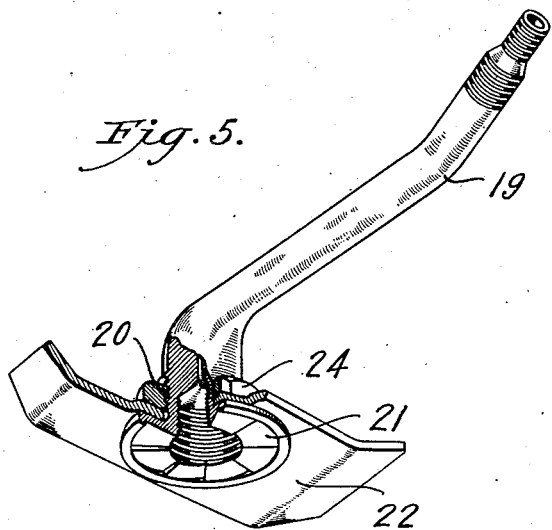

March 14, 1933.   E. EGER   1,901,637
INTERCHANGEABLE TIRE VALVE
Filed April 16, 1930   2 Sheets-Sheet 1
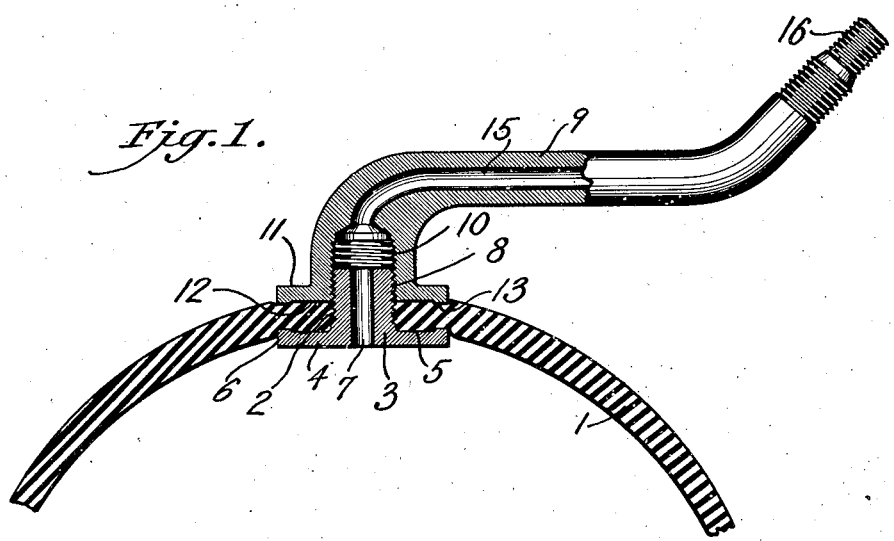
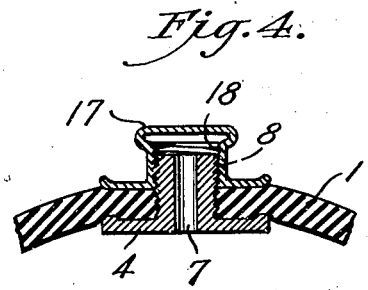
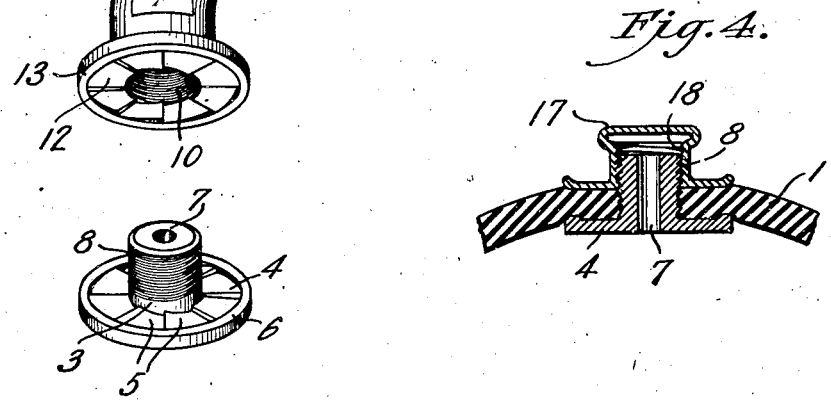
INVENTOR
Ernst Eger
BY
ATTORNEY March 14, 1933.     E. EGER     1,901,637

INTERCHANGEABLE TIRE VALVE

Filed April 16, 1930     2 Sheets-Sheet 2

INVENTOR
Ernst Eger
BY
ATTORNEY

Patented Mar. 14, 1933

1,901,637

UNITED STATES PATENT OFFICE

ERNST EGER, OF DETROIT, MICHIGAN, ASSIGNOR TO MORGAN & WRIGHT, OF DETROIT, MICHIGAN, A CORPORATION OF MICHIGAN

INTERCHANGEABLE TIRE VALVE

Application filed April 16, 1930. Serial No. 444,859.

My invention relates to interchangeable tire valves, and more particularly to valve stems and means for attaching them to tubes.

In the manufacture of tubes it is a general practice to secure a valve stem to the tube in the course of manufacture at the factory. Ordinarily, it is not advisable to change a valve stem after the tube is finished because the flanged portion or anchor of the valve must be removed from the interior of the tube. Removal of a valve stem is not only a difficult task but produces undue stretching and possible tearing of the rubber around the stem, both of which are detrimental to the tube. In many cases a fabric reinforcement is placed in the tube around the openings for the valve stem. In heavy duty tubes equipped with such fabric reinforcement, the valve stem cannot be removed through the valve stem opening but requires that the tube must be cut opposite the valve hole if the valve stem is to be removed.

Present wheel and rim construction are of widely varying characteristics and necessitate the use of valve stems in various styles and shapes for a single sized tube. The number of sized tubes now in common use is considerable. Consequently, a dealer must carry a large assortment of tubes in stock in order to be able to supply the various styles, shapes and sized tubes required. This requires the investment of considerable capital in stock and also the provision of considerable space for carrying such a stock.

Some of the tubes with special valves are demanded infrequently, and many of them tend to become obsolete, leaving such tubes on dealers' hands for considerable lengths of time with the liability of deterioration with age.

I provide different sized tubes with a base for a valve stem secured internally thereof and projecting through the usual valve stem opening. The exterior of the base is provided with means for the attachment of a valve stem of any particular type and style. Accordingly, the dealer need only carry a stock of valve stems conforming to the various styles and shapes required. When a tube with a valve stem of any particular shape or style is required, the proper sized tube is taken from stock and the desired style and shape of valve stem is applied to the anchor or base already fastened into the tube. This eliminates the need for cutting tubes, removing valve stems and inserting new valve stems to meet particular requirements, which has heretofore been a common practice.

By my invention the customer is apt to receive a tube of fresher stock than where the tubes are manufactured with the valve stems in place, since the tubes in the less frequently used styles of valve stems can be taken from current stocks rather than held indefinitely until a particular style and shape of valve stem is called for. Means are provided for closing the base and excluding air from the tubes during shipment. Means are also provided on the base and valve stems which cooperate to constitute a lock nut upon the application of the valve stem.

The accompanying drawings illustrate a present preferred embodiment of the invention, in which Figure 1 is a diagrammatic view, partly in section, of a valve stem applied to a tire tube.

Figure 6:
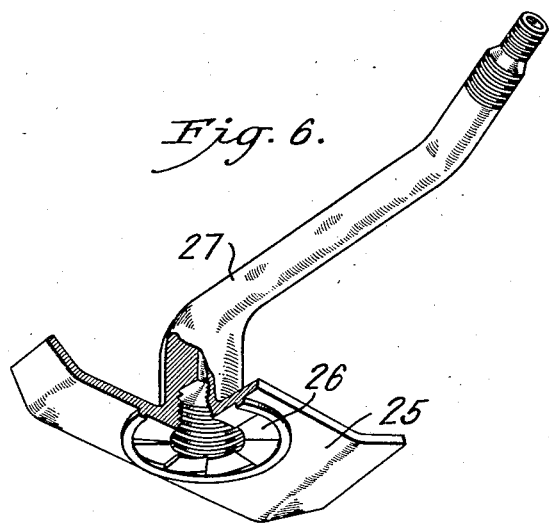

Fig. 2 is a perspective view of a valve stem.
Fig. 3 is a perspective view of a base.
Fig. 4 is a view partly in section showing a sealing cap attached to the base, and
Figures 5 and 6 are broken perspective views of different forms of valve stems and bridge washers.

Referring to Figs. 1 to 3 inclusive, a tube 1 of rubber is provided with the usual opening 2 for the reception of a valve stem. A base or anchor 3 for a tire valve is inserted in the opening 2. The base 3 comprises a circular flange 4 on the upper face of which formations 5 illustrated as radial ratchet teeth are provided for engaging the tube 2. Another formation illustrated as a circumferential flange or raised rib 6 is disposed exteriorly of the teeth for constituting a seal to prevent the leakage of air around the base when the tube is in use. The formations or projections 5 and rib 6 may obviously be used with advantage on the contacting or sealing surface of any valve, flange or element, where it is desired to prevent relative rotation and leakage between the valve element and the inflatable article to which the valve is clamped. The base 3 is provided with a longitudinal opening 7 which communicates between the interior of the tube and the atmosphere or a valve stem. The base is provided with external threads 8 which extend beyond the outer surface of the tube 1 for the reception of a valve stem or cap, as desired.

The base 3 is assembled with the tube 1 in the course of manufacture and thereafter remains as a part of the tube. The base 3 may be used as a connecting means for inflating the tube during vulcanization, in which case the tube is vulcanized to the base and retains the latter in the tube opening. If desired, the base may be covered with a suitable cement or compound, an example of which is "vulcolac", for assuring good adhesion between the metal of the base and the rubber of the tube.

The tube and attached base 3 are shipped as articles of commerce to dealers without a valve stem necessarily being attached. When it is desired to provide a tube of a given size with a particular style and shape of valve stem, a suitable valve stem 9 containing the usual valve mechanism (not shown) and internal threads 10 for cooperation with the threads 8 is secured onto the projecting portion of the base 3.

The valve stem 9 is provided with a flange 11, corresponding to the flange 4, and with formations illustrated as teeth 12 and a circumferential flange 13 for cooperating with the teeth 5 and flange 6 on the base 3 respectively. Accordingly, when the valve stem is screwed onto the base the teeth 12 and 5, which preferably slope in opposite directions, serve to prevent rotation of the valve stem when in use. The opposing flanges 6 and 13 prevent leakage of air through the joint whereby a base carried by the tube and an interchangeable valve stem constitute a two-piece valve structure for making a tight connection with the material of the tube. If desired, the surfaces of the rubber may be lubricated as by wetting or by the application of a non-injurious fluid when the valve stem 9 is placed in position. Opposite surfaces 14 of the valve stem may be flattened to serve as tool engaging surfaces, if desired. The valve stem 9 is also provided with a duct 15 and threads 16 for the application of the usual cap, not shown.

To prevent the base 3 from falling back into the tube through the opening 2 before a valve stem is permanently applied, and particularly during transportation for long distances with severe handling, a cap 17 having internal threads 18 may be applied to the base as shown in Fig. 4. If it is desired that the interior of the tube be exhausted of air and sealed from the atmosphere, as where the tube is to be confined in the smallest space possible, the cap 17 may be made imperforate and have a tight fit with the threads 8.

Referring to Figures 5 and 6, a bridge washer may be secured to the interchangeable valve stem. As shown in Figure 5, the valve stem 19 is provided with threads 20 near a flange 21 corresponding to the flange 11. A bridge washer 22 is slipped over the valve stem 19 and bears against the upper surface of the flange 21. A clamping washer 24 is threaded to the threads 20 for clamping the bridge washer in place. In Figure 6, I have shown an amplification of the invention in which a bridge washer 25 is made integral with a flange portion 26 corresponding to the flange 11. The integral bridge washer and flange are united to the valve stem 27 as a unitary structure.

While I have shown and described a present preferred embodiment of the invention, it is to be understood that the invention may be otherwise embodied within the spirit of the invention and the scope of the accompanying claims.

Having thus described my invention what I claim and desire to protect by Letters Patent is:

1. A valve for inner tubes comprising a base portion having a flange adapted to contact with the inner wall of the inner tube and a stud portion adapted to project through and clear of the wall of the inner tube, in combination with a stem portion adapted to be attached to said base portion, said stem portion having a flange adapted to cooperate with the flange of said base portion to clamp the two portions in service position on the inner tube, the tube contacting surface of at least one of said flanges having spaced projections, each projection extending outwardly from a central passageway to near the edge of said flange or flanges for preventing rotation in service of said flange with respect to said tube in at least one direction, and a raised rib surrounding said projections for preventing fluid leakage around said valve.

2. A valve for inner tubes comprising a base portion having a flange adapted to contact with the inner wall of the inner tube and a stud portion adapted to project through and clear of the wall of the inner tube, in combination with a stem portion adapted to be attached to said base portion, said stem portion having a flange adapted to cooperate with the flange of said base portion to clamp the two portions in service position on the inner tube, the tube contacting surface of each flange having circumferentially spaced teeth sloping in one direction and opposite to the direction of the teeth on the other flange for preventing rotation in service of said flanges with respect to said tube in at least one direction.

3. A valve for inner tubes comprising a base portion having a flange adapted to contact with the inner wall of the inner tube and a stud portion adapted to project through and clear the wall of the inner tube, in combination with a stem portion adapted to be attached to said base portion, said stem portion having a flange adapted to cooperate with the flange of said base portion to clamp the two portions in service position on the inner tube, the tube contacting surface of each flange having circumferentially spaced teeth sloping in one direction and opposite to the direction of the teeth on the other flange for preventing rotation in service of said flanges with respect to said tube in at least one direction, and opposed ribs surrounding said teeth for preventing fluid leakage around said valve.

4. A valve for inner tubes comprising a base portion having a flange adapted to contact with the inner wall of the inner tube and a stud portion adapted to project through and clear of the wall of the inner tube, in combination with a stem portion adapted to be attached to said base portion, said stem portion having a flange adapted to cooperate with the flange of said base portion to clamp the two portions in service position on the inner tube, the tube contacting surfaces of said flanges having oppositely inclined radial ratchet teeth, and opposed ribs surrounding said teeth for preventing fluid leakage around said valve.

5. A valve element comprising a hollow upstanding portion adapted to extend outwardly from a tube in alignment with an opening in the tube, a substantially flat plate portion fixed to said hollow portion and adapted to engage a surface of said tube around the opening in the tube, and the tube engaging surface of said plate portion being provided with a plurality of radial ratchet teeth for preventing rotation of the element with respect to the tube under service conditions.

Signed at Detroit, in the county of Wayne, and State of Michigan, this 24th day of March, 1930.

ERNST EGER.